Nov. 27, 1956   C. G. REINKING   2,771,681
MEASURING DISC WITH TOTAL INDICATOR
Filed March 31, 1953

INVENTOR.
CLEMENS G. REINKING
BY
*[signature]*
ATTORNEY

United States Patent Office 2,771,681
Patented Nov. 27, 1956

2,771,681
MEASURING DISC WITH TOTAL INDICATOR
Clemens G. Reinking, San Francisco, Calif.
Application March 31, 1953, Serial No. 345,924
5 Claims. (Cl. 33—141)

The present invention relates to measuring instruments and more particularly to a novel device of simple and inexpensive construction that can be conveniently carried in the pocket for the taking of measurements along a flat or curved surface.

The object of the invention is to provide a simple and inexpensive disc-type device which when gripped between the thumb and forefinger may be rolled over a surface to measure and indicate the distance traversed by the device.

Another object to the invention is to provide a novel roller-type device for indicating directly, that is, in distance units the total of a distance measured where the measurement taken includes more than one complete revolution of the surface contacting roller.

In the past, many others have proposed measuring instruments of the disc-type which involve the use of a wheel or disc that is adapted to be rolled over a surface to be measured. These devices like the present device are provided graduations about the periphery of the disc or wheel to indicate the distance traveled up to one revolution thereof. A limitation of these devices however, is that after the measuring disc or wheel has made one revolution it is necessary to keep mental record thereof and then add the number of revolutions or fraction thereof in order to determine the total distance measured by the disc. As an improvement upon these devices others have provided various revolution counting arrangements that are adapted to register the number of revolutions of the measuring disc, but these devices are complicated and expensive to manufacture and also involve the mental problem of multiplication to arrive at a total for the distance measured.

As distinguished from the above devices, I have by my invention provided a simple device, comprised of two discs of different diameter mounted in geared relationship with a gear ratio and calibration arrangement by which it is possible, by rolling the device over a surface, to read in distance units from one of said discs the total distance covered by full revolutions rolled by the other disc, and to read in like distance units from said other disc the distance covered in a further partial revolution thereof.

Other objects and advantages of the invention will be in part evident to those skilled in the art and in part pointed out hereinafter in connection with the accompanying drawing, wherein there is shown by way of illustration and not of limitation a preferred embodiment thereof.

Figure 1:
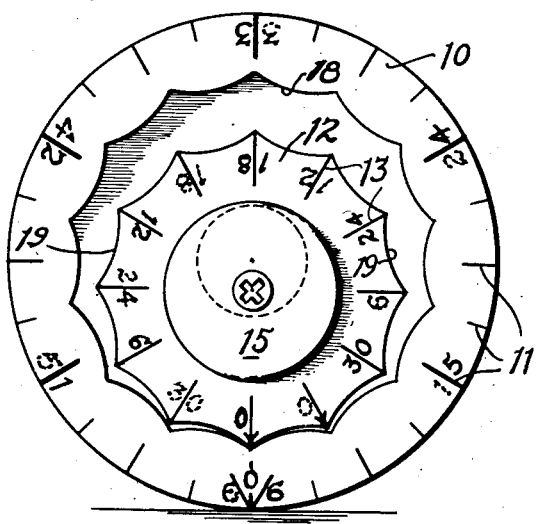
Figure 1 is a front view of my improved measuring device.
Figure 2:
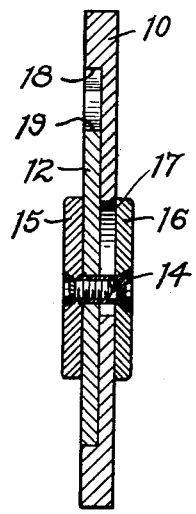
Figure 2 is a vertical sectional view taken centrally through the device as shown in Figure 1 of the drawing, and Figures 3 to 6, inclusive, are fragmentary front views showing the parts in different relative positions.

As shown in Figures 1 and 2 of the drawing, my device comprises an outer disc 10, having distance measuring calibrations 11 arranged about its periphery, and an inner disc 12 having numerical indices 13, which when in operation will indicate in terms of the calibrations 11 on the disc 10, the distance traversed by the outer disc 10 when rolled over a surface the dimension of which is being measured. As is more clearly shown in Figure 2 the outer disc 10 and the inner disc 12 are held flat-wise in contact with each other by means of a threaded axis forming member 14 upon which the inner disc 12 is journaled. Associated with the axis forming member 14 there are two button-like members 15 and 16 that form a grip by which the device is held between the thumb and forefinger by an operator. As here shown the outer disc 10 has an enlarged central clearance or opening 17 within which the threaded member 14 moves as the disc 10 is rolled over a surface. The outer disc 10 also has an over-hanging flange or gear-tooth carrying surface 18 with which a similarly formed surface 19 at the outer periphery of the inner disc 12 cooperates an internal gear when the device is in operation. In these figures in the drawing the device is shown at twice its normal size and the calibrations are therefore to be understood as in inches.

By referring to Figure 1, it will be noted that the calibrations 11 of the disc 10 have a zero or index point "0," here shown at the bottom of the view. Extending from each side of this zero or index there are numerical indices reading from 1 to 6 inches in opposite directions. By this particular arrangement a distance of 6 inches is measured when the disc 10 has made one complete revolution in either direction and for any fraction of a revolution the graduations from 1 to 6 will indicate the actual fraction of a revolution traversed as will be evidenced by the particular graduation then brought into contact with the surface. For example, upon a half revolution of the disc 10 the numeral 3 will engage with the surface and thus indicate that a distance of 3 inches has been traversed. In the drawing one series of numerical graduations is shown with solid lines while the other set of graduation is formed with dots. In practice, however, the graduations may be of a different "case" type or they may be inscribed in different colors.

Now with reference to the inner disc 12, it will be noted that this disc carries two zero or index marks either one of which may be placed in register with the zero ("0") mark of the disc 10 at the start of any measuring operation. This disc 12, however, instead of being graduated in linear dimensions is provided with two sets of graduations that bear a definite ratio to the graduations 11 of the outer disc 10. In the present instance this ratio is 6 to 1. In other words, the outer disc 10 needs to be rolled completely around six times before the inner disc 12 has made one complete revolution counting operation. In other words, as here shown, the inner disc is calibrated in multiples of the circumference of the outer disc 10 and these graduations bear a direct relation to the distance measured up to a total which corresponds to that obtained by six complete revolutions of the outer disc 10. The graduations 13 upon the inner disc 12 like the graduations 11 upon the disc 10 also extend in opposite directions from a particular zero point and in order to avoid confusion the inner disc is provided with two zero points or indices one of which is adapted for use when rolling the disc 10 in one direction and the other of which is adapted for use when the disc 10 is rolled in the opposite direction.

While the graduations have been defined above as arranged to produce the results at a ratio of 6 to 1, the gear ratio between the outer disc 10 and the inner disc 12 does not necessarily have a pitch line ratio 6 to 1. The outer disc 10 as it is here shown has 14 flutes or prominences which might correspond with the teeth of an internal ring-gear and the inner disc has only 12 such flutes or prominences which engage the flutes or prominences of the outer disc 10, and for this reason when the outer disc has rolled through one complete revolution the inner disc will be turned the distance of its 12 plus 2 flutes, or in other words, one revolution and a sixth from its zero or starting point.

With the calibrations arranged as shown this will bring into register with the zero or index point of the outer disc 10 a numeral in inches corresponding to the number of inches covered by the total revolutions of the outer disc 10.

Figure 3:
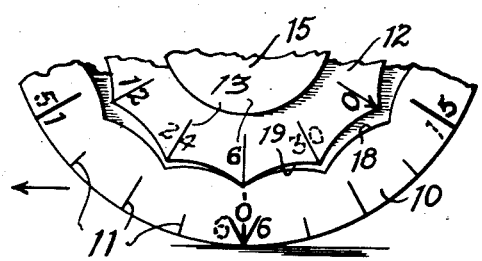
Figure 4:
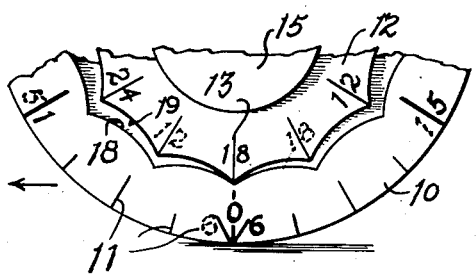

For the purpose of describing the operation of my invention I have in Figures 3 and 4 of the drawing shown the positions of the outer disc 10 and the inner disc 12, respectively, at the end of one, and three complete revolutions of the outer disc 10 when rolled toward the left as viewed in the drawing. In Figure 3, the inner disc 12, indicates over the zero index on the outer disc 10, that the outer disc has made one complete revolution or has traveled six inches, this being the circumference of the disc 10. In Figure 4, the inner disc 12 indicates that the outer disc 10 has moved through three complete revolutions or a total distance of 18 inches as is indicated above the zero or index on the outer disc 10.

Figure 5:
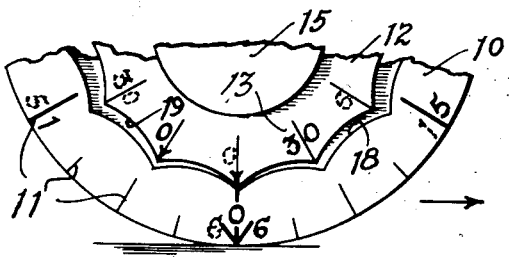
Figure 6:
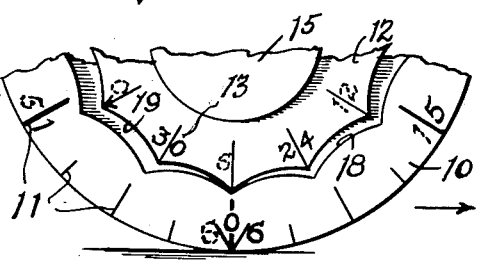

In like manner, Figures 5 and 6, show the operation of my device when rolled to the right. In Figure 5 the zero index of the inner disc 12, which is adapted for use when the device is rolled to the left as viewed in the drawing, is shown as in register with the zero of the outer disc 10. This is the position of the parts at the start in a measuring operation. In Figure 6, the inner disc 12, is shown as indicating a distance of six inches which corresponds to one complete revolution of the outer disc 10.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention which I claim and desire to secure by Letters Patent is:

1. In a measuring device of the character described, the combination of an outer disc having an index starting point and distance measuring graduations arranged about its outer periphery adapted when rolled over a surface to indicate the distance travelled between any two points thereupon, said outer disc having an internal ring-gear forming surface, a second disc of smaller diameter arranged in coplanar relation with the ring-gear surface of said outer disc, means for holding said discs in relative rotative relationship as said outer disc is rolled over a surface, the tooth-wise ratio between the engaging surfaces of said discs being such that said second disc will be rotated one and a fraction revolutions upon each full revolution of said outer disc, and numerical indicia upon said inner disc so related to the index starting point upon said outer disc as to indicate directly the total distance covered by full revolutions of the latter in terms of the graduations upon said inner disc when said outer disc is rotated through at least one complete revolution.

2. In a measuring device of the character described, the combination of an outer disc having an internal ring-gear forming surface and distance measuring graduations arranged about its outer periphery adapted when rolled over a surface to directly indicate the distance covered by partial revolutions thereof, a second disc of smaller diameter having a gear-toothed periphery arranged in coplanar relation with the ring-gear surface of said outer disc, means for holding said discs in geared rotative relationship as said outer disc is rolled over a surface, said outer and second disc each having a starting or zero index and the gear ratio between the engaging surfaces of said discs being such that said inner disc will be rotated one and a fraction revolutions upon each full revolution of said outer disc, and numerical indicia upon said inner disc so related to the starting point of the graduations of said outer disc as to indicate directly the total distance traversed by full revolutions of said outer disc when rotated through at least one complete revolution.

3. In a measuring device of the character described, the combination of a disc having a reference point and distance measuring graduations about its periphery adapted upon being rolled over a surface to indicate distance covered in a single or partial revolution thereof, a second disc of smaller diameter disposed in parallel contacting relation with said first disc having an internal ring gear connection with said first disc, said smaller disc having graduations corresponding to multiples of the periphery of said first disc and being adapted and arranged to turn more than one revolution for each complete revolution of said first disc, whereby an indication of the total distance covered by a plurality of complete revolutions of said first disc will be directly readable upon said second disc when adjacent said reference point, and means forming an axle for said second disc for securing said first and second discs in relative rotative relation adapted and arranged to be gripped between the thumb and forefinger of an operator at opposite sides of said discs when rolled over a surface.

4. In a distance measuring device of the character described, the combination of an outer disc having distance graduations arranged about its periphery, a second disc also having distance graduations at its periphery, each of said discs having a zero index adapted to be placed in register at the beginning of a measuring operation, the graduations of said second disc being in multiples of the periphery of said first disc, means forming an axle about which said second disc turns extending freely through an enlarged central opening in said first disc, a geared driving connection between said first and second discs having a ratio that will position a graduation upon said second disc with respect to the zero index on said first disc so as to indicate the distance covered by full revolutions over which said first disc is rolled, whereby distances greater than the circumference of said first disc may be directly indicated upon said second disc, and means carried by the extending ends of said axle forming means for securing said discs in rotative relation engageable by the thumb and forefinger of an operator, whereby said first disc will operate as a self laying trackway for said second disc when said device is rolled over a surface to be measured.

5. In a distance measuring device of the character described, the combination of an outer disc having a large central opening and an overhanging portion with a fluted inner surface and graduations related to a starting point index in terms of linear distance arranged about its perimeter, whereby the distance between two points may be determined by rolling said disc between said points, an inner disc having a fluted outer periphery engaging the fluted surface of said outer disc and a thickness corresponding to the overhanging fluted surface of said outer disc, said inner disc having graduations related to a starting point index in multiples of the circumference of said outer disc, whereby the sum total of the distance covered by full revolutions in the rolling of said outer disc over a surface through more than one revolution will be directly indicated upon said inner disc, and an axle forming member for said inner disc having enlarged disc-like members at its ends of a diameter sufficient to overlap the large central opening of said outer disc, said enlarged disc-like members being adapted and arranged to be gripped between the thumb and forefinger of an operator in rolling said outer disc over a surface to be measured.

References Cited in the file of this patent

UNITED STATES PATENTS

| | | |
|---|---|---|
| 211,327 | Heberline et al. | Jan. 14, 1879 |
| 1,416,380 | Petersen | May 16, 1922 |